United States Patent
Lee et al.

(10) Patent No.: US 10,087,078 B2
(45) Date of Patent: Oct. 2, 2018

(54) DISPERSING METHOD OF CARBON NANOTUBE, DISPERSING APPARATUS OF CARBON NANOTUBE, AND CARBON NANOTUBE DISPERSION OBTAINED THEREBY

(75) Inventors: Dong Hyun Lee, Suwon-si (KR); Seung Yong Son, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 923 days.

(21) Appl. No.: 13/364,371

(22) Filed: Feb. 2, 2012

(65) Prior Publication Data
US 2013/0345323 A1 Dec. 26, 2013

Related U.S. Application Data

(63) Continuation of application No. PCT/KR2010/005115, filed on Aug. 4, 2010.

(30) Foreign Application Priority Data

Aug. 4, 2009 (KR) .................. 10-2009-0071661

(51) Int. Cl.
*C01B 32/166* (2017.01)
*B01F 3/08* (2006.01)
(Continued)

(52) U.S. Cl.
CPC .......... *C01B 31/0273* (2013.01); *B82Y 30/00* (2013.01); *B82Y 40/00* (2013.01); *C01B 32/174* (2017.08)

(58) Field of Classification Search
CPC ............ C01B 31/0273; C01B 31/0253; C01B 31/0213; C01B 31/022; C01B 2202/08; B82Y 30/00; B82Y 40/00; H01F 1/0045
(Continued)

(56) References Cited

U.S. PATENT DOCUMENTS 6,741,019 B1 * 5/2004 Filas et al. .................. 313/355
7,037,479 B2 * 5/2006 Burgin ....................... 423/447.1
(Continued)

FOREIGN PATENT DOCUMENTS

JP      2008013415 A  *  1/2008
KR      10-0753539 B1    8/2007
(Continued)

OTHER PUBLICATIONS

Machine Translation KR 100753539 (Pub. Date Aug. 27, 2007), online @ http://kposd.kipo.go.kr:8088/kiponet/up/kpion/patent/publication/selectLstPatentPublication.do., (downbloaded Jun. 15, 2014), pp. 1-20.*

(Continued)

*Primary Examiner* — Daniel S Metzmaier
(74) *Attorney, Agent, or Firm* — NSIP Law

(57) ABSTRACT

The present disclosure relates to a dispersing method of a carbon nanotube comprising: the first step of mixing a carbon nanotube aggregate, a magnetic material and a dispersant; and the second step of applying a magnetic field to the mixture obtained in the first step to disperse the carbon nanotube aggregate, a dispersing apparatus of a carbon nanotube, and a carbon nanotube dispersion obtained thereby. A carbon nanotube aggregate can be more effectively dispersed without damaging a carbon nanotube by the dispersing method of a carbon nanotube according to the present disclosure.

18 Claims, 3 Drawing Sheets

(51) Int. Cl.
    *C01B 31/02*     (2006.01)
    *B82Y 30/00*     (2011.01)
    *B82Y 40/00*     (2011.01)
    *C01B 32/174*     (2017.01)
    *B01D 71/46*     (2006.01)

(58) Field of Classification Search
    USPC .......................... 516/117; 361/160; 422/261
    See application file for complete search history.

(56) References Cited

U.S. PATENT DOCUMENTS

| | | | | |
|---|---|---|---|---|
| 8,426,489 | B1* | 4/2013 | Al-Haik | A61L 27/443 |
| | | | | 433/192 |
| 8,673,258 | B2* | 3/2014 | Kim et al. | 423/447.2 |
| 2003/0039604 | A1* | 2/2003 | Niu | B82Y 30/00 |
| | | | | 423/447.1 |
| 2005/0239948 | A1* | 10/2005 | Haik et al. | 524/496 |
| 2006/0099135 | A1* | 5/2006 | Yodh et al. | 423/447.1 |
| 2006/0115640 | A1* | 6/2006 | Yodh et al. | 428/221 |
| 2007/0110977 | A1* | 5/2007 | Al-Haik | B29C 70/62 |
| | | | | 428/292.1 |
| 2007/0275627 | A1* | 11/2007 | Jung et al. | 445/51 |
| 2008/0020487 | A1* | 1/2008 | McLean et al. | 438/1 |
| 2011/0042276 | A1* | 2/2011 | Miller | B03C 1/01 |
| | | | | 209/8 |
| 2014/0183139 | A1* | 7/2014 | Lee et al. | 210/695 |
| 2015/0137024 | A1* | 5/2015 | Lee | H01F 1/0063 |
| | | | | 252/62.55 |

FOREIGN PATENT DOCUMENTS

| | | |
|---|---|---|
| KR | 10-0792594 B1 | 1/2008 |
| KR | 10-2009-0080080 A | 7/2009 |

OTHER PUBLICATIONS

Machine Translation of Publ. No. JP 2008-013415, published Jan. 2008, Japan Patent Office, Tokyo, Japan, online at https://dossier1.j-platpatinpit.go.jp/tri/all/odse/ODSE_GM101_Top.action (Downloaded May 19, 2016), pp. 1-7.*

2007. Alnico. Hawley's Condensed Chemical Dictionary. 43, John Wiley & Sons, Inc. Online @ http://onlinelibrary.wiley.com/book/10.1002/9780470114735/titles headwords = Alnico, downloaded Nov. 7, 2016), pp. 1 of 1.*

Cole-Palmer 1987 1988 Catalogue, Cole-Palmer Instrument Co. Chicago, Illinois, USA (1986 ©), pp. 416-417.*

Garmestani et al., Polymer-Mediated Alignment of Carbon Nanotubes under High Magnetic Fields, Advanced Materials, Nov. 17, 2003, vol. 15, No. 22, pp. 1918-1921.*

Seung Yonu Son et al., "Effective disentangling method of bundled multi-walled carbon nanotubes into individual multi-walled carbon nanotubes by magnetic-field induction," Journal of Industrial and Engineering Chemistry, 46 (2017) 28-34 (Available online Oct. 3, 2016). (Year: 2016).*

International Search Report dated Apr. 29, 2011, in counterpart International Application No. PCT/KR2010/005115 (5pp, including English translation).

* cited by examiner

DISPERSING METHOD OF CARBON NANOTUBE, DISPERSING APPARATUS OF CARBON NANOTUBE, AND CARBON NANOTUBE DISPERSION OBTAINED THEREBY

CROSS-REFERENCE TO RELATED APPLICATION

This application is a Continuation of International Application No. PCT/KR2010/005115 filed Aug. 4, 2010, which claims the benefits of Korean Patent Application No. 10-2009-0071661 filed Aug. 4, 2009. The entire disclosure of the prior application is incorporated herein by reference in its entirety.

TECHNICAL FIELD

The present disclosure relates to a dispersing method of a carbon nanotube, a dispersing apparatus of a carbon nanotube, and a carbon nanotube dispersion obtained thereby.

BACKGROUND ART

A carbon nanotube has a cylinder-shaped structure in a nanometer unit, wherein carbon atoms are arranged in a spiral form. With this structure, the carbon nanotube has its unique physical properties that are not observed in a general material. With regard to such a carbon nanotube, various application technologies have been developed using the excellent physical properties of the carbon nanotube, e.g., its unique electrical property, intensity, a restoration property, and thermal conductivity.

However, in case of single-walled carbon nanotubes, all constitutional atoms thereof are surface atoms. Accordingly, the carbon nanotubes are easily aggregated by a van der Waals force. Most single-walled carbon nanotubes are formed in a structure of a bundle or an aggregate consisting of a multiple number of carbon nanotubes. Multi-walled carbon nanotubes also are in the state of being entangled with one another like a net thereby forming a large aggregate.

Chemical and physical operations of the aggregate of carbon nanotubes are difficult. And also the aggregation of carbon nanotubes has been a serious obstacle to the industrial application of the carbon nanotubes. Under the circumstances, the necessity to develop a technology relating to a method for dispersing a carbon nanotube aggregate is increasing.

With respect to a conventional method for dispersing a carbon nanotube in a solution, there has been proposed a physical dispersion treatment method such as an ultrasonic wave treatment. As to a specific example of the method for dispersing a carbon nanotube, there has been known a method of putting a single-walled carbon nanotube aggregate in acetone and dispersing the carbon nanotubes therein through an ultrasonic wave treatment.

In addition to the ultrasonic wave treatment, there has been proposed a method of increasing compatibility to a solvent of a carbon nanotube by adding a surfactant or other materials to a solvent.

However, in the conventional method for dispersing a carbon nanotube, an effect in dispersion of a carbon nanotube is not remarkable. Further, an external damage to a carbon nanotube may occur. Thus, development of a method for easily dispersing a carbon nanotube without damaging the carbon nanotube has been demanded.

DISCLOSURE OF THE INVENTION

Problems to be Solved by the Invention

The present disclosure has been created to solve the above-described conventional technical problems. An illustrative embodiment provides a dispersing method of a carbon nanotube, which is capable of more effectively dispersing a carbon nanotube aggregate without damaging the carbon nanotube.

Another illustrative embodiment provides a dispersing apparatus of a carbon nanotube, which is capable of more effectively dispersing a carbon nanotube by using the dispersing method of a carbon nanotube.

Another illustrative embodiment provides a carbon nanotubes dispersion obtained by the dispersing method of a carbon nanotube.

Means for Solving the Problems

As one technical means to solve the above-described problems, an illustrative embodiment provides a dispersing method of a carbon nanotube including: a first step of mixing a carbon nanotube aggregate, a magnetic material, and a dispersant; and a second step of applying a magnetic field to the mixture obtained in the first step to disperse the carbon nanotube aggregate.

As another technical means to solve the above-described problems, an illustrative embodiment provides a dispersing apparatus of a carbon nanotube including: a vessel that contains a carbon nanotube aggregate, a magnetic material, and a dispersant; and a magnetic field generator that is provided in one side of the vessel to apply a magnetic field into the vessel.

As another technical means to solve the above-described problems, an illustrative embodiment provides a carbon nanotube dispersion obtained by the above-described dispersing method.

Effect of the Invention

With the dispersing method of a carbon nanotube in accordance with an illustrative embodiment, it is possible to more effectively disperse a carbon nanotube without damaging the carbon nanotube. Furthermore, it is possible to disperse a carbon nanotube aggregate by simply applying an external magnetic field without carrying out a separate process such as a ball mill process, a chemical treatment, or surface introduction of an additional functional group. Thus, productivity can also be improved.

BEST MODE FOR CARRYING OUT THE INVENTION

Figure 1:
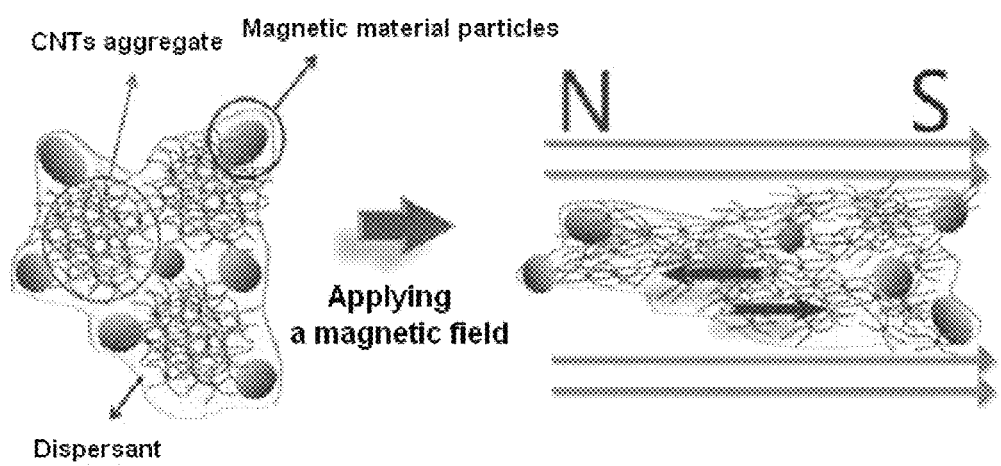
FIG. 1 is a schematic process diagram schematically showing a dispersing method of a carbon nanotube in accordance with an illustrative embodiment.

An illustrative embodiment is directed to a dispersing method of a carbon nanotube including: a first step of mixing a carbon nanotube aggregate, a magnetic material, and a dispersant; and a second step of applying a magnetic field to the mixture obtained in the first step to disperse the carbon nanotube aggregate.

Hereinafter, the dispersing method of a carbon nanotube in accordance with an illustrative embodiment will be described in more detail.

As described above, the dispersing method of a carbon nanotube in accordance with an illustrative embodiment includes a first step of mixing a carbon nanotube aggregate, a magnetic material, and a dispersant, and a second step of applying a magnetic field to the mixture obtained in the first step to disperse the carbon nanotube aggregate.

More specifically, the first step relates to producing a mixture by mixing a carbon nanotube aggregate, a magnetic material, and a dispersant.

In the illustrative embodiment, the "carbon nanotube aggregate" means that at least one carbon nanotubes are aggregated in the form of a bundle or an aggregate. The "carbon nanotube aggregate" may include any carbon nanotubes in the form of an aggregate that need to be dispersed by the dispersing method of a carbon nanotube in accordance with the illustrative embodiment.

In the illustrative embodiment, the "magnetic material" is a material having a magnetic property. The "magnetic material" may include any material having a magnetic property such that when an external magnetic field is applied, the material is arranged in the direction of the magnetic field in response to the magnetic field. A type of the magnetic material is not limited, but, for example, various types of ferrites known in the related art may be used. Specifically, a ferrite containing one or at least two of an iron oxide, cobalt, nickel, a chromium oxide, and others may be used.

More specifically, in order to further enhance a magnetic property of the ferrite, the magnetic material may contain one or at least two of aluminum, strontium, neodymium, samarium, boron, and others. As to a more specific example, a ferrite containing neodymium may be used.

As described above, the mixture obtained in the first step has been produced by mixing the magnetic material and the dispersant with the carbon nanotube aggregate. Here, contents of the contained components are not limited. For example, however, the mixture obtained in the first step may contain about 1 part by weight to about 200 parts by weight, in particular, about 50 parts by weight to about 150 parts by weight of the magnetic material, with respect to about 10 parts by weight of the carbon nanotube aggregate.

If the content of the magnetic material in the mixture is below about 1 part by weight, with respect to about 10 parts by weight of the carbon nanotube aggregate, the magnetic material may not effectively respond to the carbon nanotube aggregate desired to be dispersed. Accordingly, a dispersing force by movement of the magnetic material may not be transferred to all carbon nanotube aggregates. As a result, the effect in dispersion may be reduced. If the content of the magnetic material is above about 200 parts by weight, the redundant magnetic materials are aggregated with one another. Accordingly, a large energy is required when purifying the magnetic materials, and efficiency in costs would be reduced.

In the illustrative embodiment, the "dispersant" contains a polymer resin material or a material containing a solvent or others and has a certain viscosity. The dispersant is mixed with the carbon nanotube aggregate and the magnetic material to disperse the carbon nanotube aggregate through a shear stress generated when the magnetic material is arranged in the direction of the magnetic field in response to the application of the magnetic field.

A type of the dispersant is not limited. As described above, the dispersant may include any material that can be used as a dispersant having a certain viscosity to disperse the carbon nanotube aggregate. For example, water, alcohol, an organic solvent, a polymer resin having a controllable viscosity, plasticizer, and others may be used.

As to a specific example, the dispersant may contain one or at least two of a solvent such as water and alcohol; a polymer resin such as an epoxy resin, an urea resin, a melamine resin, a phenol resin, an urethane resin, an amide resin, an acryl resin, and a silicon resin; a natural oil such as triglyceride; a phthalic acid ester such as di-2-ethylhexyl-phthalate (DOP), dibutyl phthalate (DBP), dihexylphthalate (DHP), diisononylphthalate (DINP), or diisodecylphthalate (DIDP); a maleic acid ester such as dioctylmalate; an adipic acid ester such as dioctyladipate; a trimellitic acid ester such as triethylhexyltrimellitate (TOTM), triisononyltrimellitate (TINTM), or triisodecyltrimellitate (TIDTM); a phosphoric acid ester of an aliphatic alcohol or an aromatic alcohol; and a polyester such as a chlorinated polyester.

In the first step, the dispersant may further contain a viscosity modifier such as water, alcohol, ketone, and aromatic hydrocarbon to control a viscosity of the dispersant to be effective for the dispersion.

As to a more specific example, if a water soluble polymer is used as the dispersant, water or alcohol may be added as the viscosity modifier. If a common polymer is used as the dispersant, an aromatic hydrocarbon or ketone may be added as the viscosity modifier.

The viscosity modifier controls the viscosity of the mixture to a sufficient viscosity enough to enable the magnetic material mixed in the dispersant to move in response to the application of the magnetic field.

In the mixture obtained in the first step, a content of the dispersant is not limited. For example, however, the dispersant may be contained in an amount of about 100 parts by weight to about 10,000 parts by weight, in particular, about 200 parts by weight to about 500 parts by weight, with respect to about 10 parts by weight of the carbon nanotube aggregate.

If the content of the dispersant in the mixture is below about 100 parts by weight, with respect to about 10 parts by weight of the carbon nanotube aggregate, the volume of the carbon nanotubes becomes greater than the volume of the dispersant so that the carbon nanotubes would not be immersed in the dispersant. If the content of the dispersant is above about 10,000 parts by weight, an unnecessary dispersant is mixed so that the efficiency in costs would be reduced.

Furthermore, the mixture obtained in the first step moves such that the magnetic material is arranged in a certain direction in response to the application of the magnetic field. At the same time, the viscosity of the mixture may be controlled within a proper range such that the carbon nanotube aggregate can be easily dispersed by the shear stress generated from the movement of the mixture. The range of the viscosity of the mixture may be variously controlled depending on intensity of the magnetic field. For example, however, the viscosity of the mixture may be about 30 cP to about 5,000 cP.

If the viscosity of the mixture is below about 30 cP, no shear stress is generated by the viscosity of the dispersant so that the carbon nanotube aggregate would not be easily dispersed. If the viscosity of the mixture is above about 5,000 cP, the magnetic material does not easily move so that the shear stress would not be easily generated.

The second step relates to dispersing the carbon nanotube aggregate by applying a magnetic field to the mixture obtained in the first step.

In the second step, the magnetic field intensity to be applied is not limited and is sufficient if it can generate a sufficient shear stress enough to enable the magnetic material to be arranged in the direction of the magnetic field, and thereby, dispersing the carbon nanotube aggregate. The magnetic field intensity is not limited, but, for example, may be about 0.05 T to about 20 T in the second step.

If the magnetic field intensity is below about 0.05 T, influence of the magnetic field applied to the magnetic material contained in the mixture becomes weak so that dispersion would not be easily accomplished. If the magnetic field intensity is above about 20 T, the magnetic material in the dispersant may rapidly move thereby damaging a carbon nanotube.

In the second step, time to apply the magnetic field is not limited and is sufficient if it enables the magnetic material to be arranged in the direction of the magnetic field, and thereby, dispersing the carbon nanotube aggregate.

FIG. 1 is a schematic process diagram schematically showing a dispersing method of a carbon nanotube in accordance with an illustrative embodiment. With reference to FIG. 1, when the magnetic field is applied to the mixture of the carbon nanotube aggregate (CNTs aggregate), the magnetic material (ferrite), and the dispersant (epoxy resin), the magnetic material is arranged in the direction of the magnetic field. Then, the carbon nanotube aggregate mixed in the dispersant having a certain viscosity can be easily dispersed by the shear stress generated from the arrangement of the magnetic material without causing an external damage to the carbon nanotubes.

An illustrative embodiment is also directed to a dispersing apparatus of a carbon nanotube including: a vessel that contains a carbon nanotube aggregate, a magnetic material, and a dispersant; and a magnetic field generator that is provided in one side of the vessel to apply a magnetic field into the vessel.

Here, as described above, the vessel contains the carbon nanotube aggregate, the magnetic material, and the dispersant and mixes them therein to contain the mixture obtained. A material, a shape, and a size of the vessel are not limited. For example, a vessel generally used in the related art, i.e., a glass vessel may be used.

The magnetic field generator can apply the magnetic field having a certain intensity into the vessel to arrange the magnetic material of the mixture contained in the vessel.

The dispersing apparatus of a carbon nanotube in accordance with an illustrative embodiment may further include a power supply unit that supplies a power to the magnetic field generator.

Figure 2:
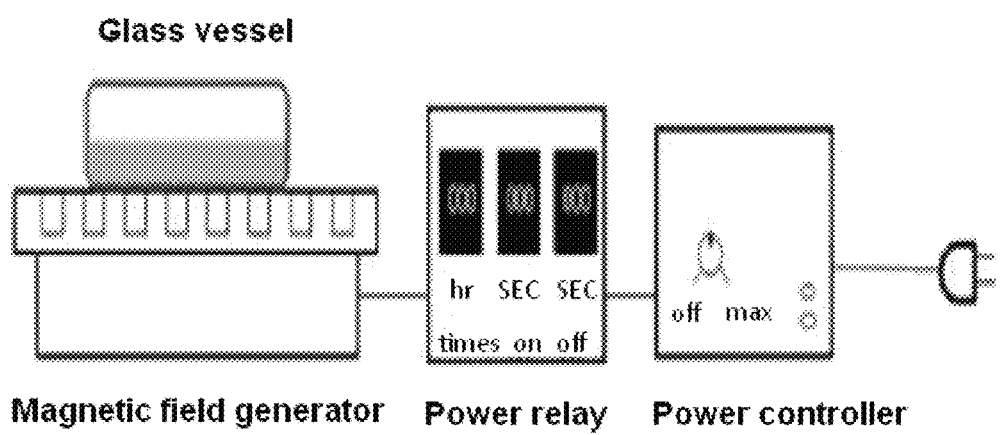
FIG. 2 is a schematic view schematically showing a dispersing apparatus of a carbon nanotube in accordance with an illustrative embodiment.

FIG. 2 shows a schematic shape of the dispersing apparatus of a carbon nanotube in accordance with an illustrative embodiment.

With reference to FIG. 2, the dispersing apparatus of a carbon nanotube in accordance with an illustrative embodiment includes a glass vessel, a magnetic field generator, and a power supply unit.

In the dispersing apparatus of a carbon nanotube in accordance with an illustrative embodiment, the carbon nanotube aggregate, the magnetic material, and the dispersant are supplied and mixed in a glass vessel. The magnetic field generator receives a power from the power supply unit to apply the certain magnetic field to the vessel. Accordingly, the carbon nanotube aggregate in the mixture contained in the glass vessel can be dispersed.

Here, the power supply unit may include a power relay capable of controlling time to apply a magnetic field and an on/off cycle, and a power controller that controls the magnetic field intensity.

It is possible to disperse the carbon nanotube aggregate by using the dispersing apparatus of a carbon nanotube in accordance with an illustrative embodiment. The shape of the dispersing apparatus of a carbon nanotube in accordance with an illustrative embodiment is not limited to the shape illustrated in FIG. 2.

An illustrative embodiment is also directed to a carbon nanotube dispersion obtained by the dispersing method of a carbon nanotube of an illustrative embodiment.

Since there are no external damages to the carbon nanotube dispersion obtained by using the shear stress generated from the simple application of the magnetic field without carrying out a physical or chemical process, it is possible to prevent deterioration of the unique physical properties of a carbon nanotube.

MODES TO CARRY OUT THE INVENTION

The above-described illustrative embodiment will be described in detail based on examples. The examples are merely exemplary, and the illustrative embodiment is not limited to the examples.

Example 1

0.2 g of a carbon nanotube aggregate, 2 g of ferrite particles, and 10 g of an epoxy resin were mixed. 2-propanone is added as a solvent, and the viscosity of the mixture is controlled to 38 cP.

Subsequently, 0.08 T of a magnetic field was applied to the mixture for 10 hours to disperse the carbon nanotube aggregate.

Comparative Example 1

The carbon nanotube aggregate was dispersed under the same condition as used in Example 1, except that the magnetic field is not applied.

Experimental Example

1. SEM Photograph Measurement

The carbon nanotube dispersions obtained in Example 1 and Comparative Example 1 were sprayed on a glass. Thereafter, a degree of dispersion of the carbon nanotube was observed through an SEM analysis.

Figure 3:
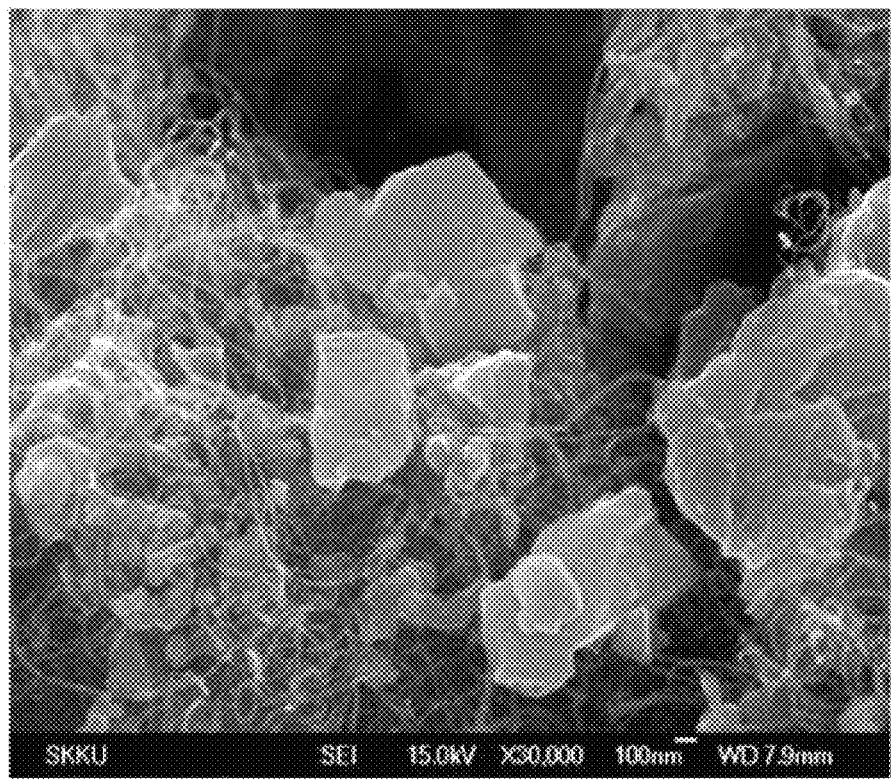
FIGS. 3 and 4 are photographs prior to and after applying a magnetic field to a carbon nanotube-ferrite mixture produced in Example 1.
Figure 4:
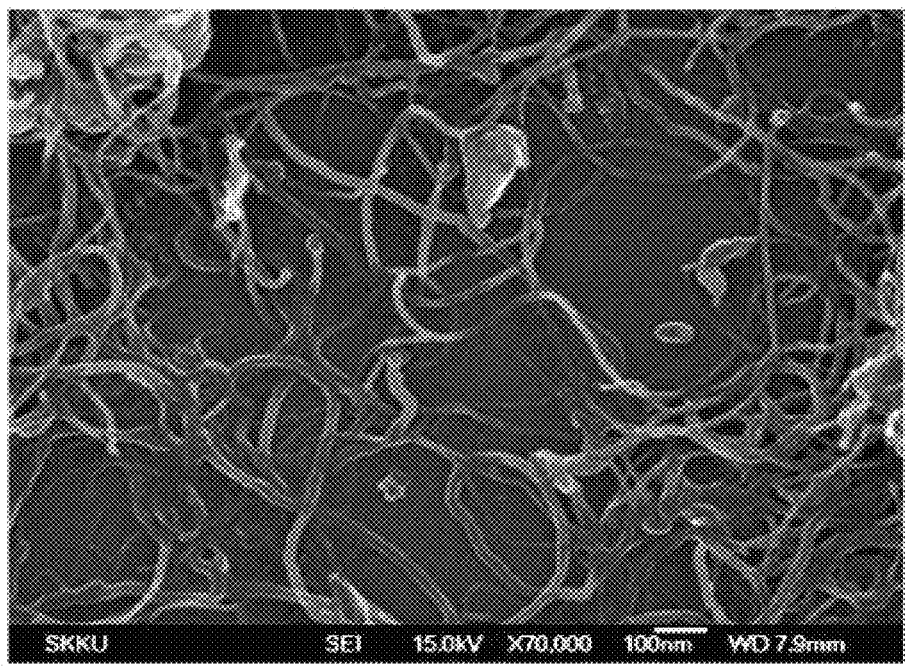

FIG. 3 shows a SEM photograph of the carbon nanotube obtained in accordance with Comparative Example 1. FIG. 4 shows an SEM photograph of the carbon nanotube obtained in accordance with Example 1.

What is claimed is:
1. A dispersing method of a carbon nanotube, comprising:
a first step of mixing a carbon nanotube aggregate, a magnetic material, and a dispersant;
a second step of dispersing the carbon nanotube aggregate through a shear stress generated in response to the mixture being moved by application of a magnetic field to the mixture obtained in the first step to disperse the carbon nanotube aggregate; and controlling a time and an on/off cycle of the applied magnetic field.

2. The dispersing method of the carbon nanotube in claim 1, wherein in the first step, the magnetic material contains any one or any combination of any two or more of an iron oxide, cobalt, nickel, and a chromium oxide.

3. The dispersing method of the carbon nanotube in claim 2, wherein the magnetic material further contains any one or any combination of any two or more of aluminum, strontium, neodymium, samarium, and boron.

4. The dispersing method of the carbon nanotube in claim 1, wherein the mixture obtained in the first step contains about 1 part by weight to about 200 parts by weight of the magnetic material, with respect to about 10 parts by weight of the carbon nanotube aggregate.

5. The dispersing method of the carbon nanotube in claim 1, wherein in the first step, the dispersant contains any one or any combination of any two or more of water, alcohol, an epoxy resin, an urea resin, a melamine resin, a phenol resin, an urethane resin, an amide resin, an acryl resin, and a silicone resin, a natural oil, a phthalic acid ester, a maleic acid ester, an adipic acid ester, a trimellitic acid ester, a phosphoric acid ester, and a polyester.

6. The dispersing method of the carbon nanotube in claim 5, wherein in the first step, the dispersant further contains any one or any combination of any two or more of water, alcohol, ketone, and an aromatic hydrocarbon.

7. The dispersing method of the carbon nanotube in claim 1, wherein the mixture obtained in the first step contains about 100 parts by weight to about 10,000 parts by weight of the dispersant, with respect to about 10 parts by weight of the carbon nanotube aggregate.

8. The dispersing method of the carbon nanotube in claim 1, wherein a viscosity of the mixture obtained in the first step is about 30 cP to about 5,000 cP.

9. The dispersing method of the carbon nanotube in claim 1, wherein in the second step, the magnetic field intensity is about 0.05 T to about 20 T.

10. A dispersing apparatus of a carbon nanotube, comprising: a vessel that contains a carbon nanotube aggregate, a magnetic material, a dispersant; and a magnetic field generator that is provided on one side of the vessel to apply a magnetic field into the vessel to move the magnetic material to cause a shear stress to the carbon nanotube aggregate, and a power supply unit including a power relay capable of controlling time to apply a magnetic field and an on/off cycle.

11. The dispersing apparatus of the carbon nanotube in claim 10, wherein the apparatus further contains a power supply unit that supplies a power to the magnetic field generator.

12. The dispersing method of the carbon nanotube in claim 1, wherein the method does not include a step of dispersing by ultrasonic wave treatment.

13. The dispersing method of the carbon nanotube in claim 1, wherein the mixture is moved by the magnetic particles spreading the mixture.

14. The dispersing method of the carbon nanotube in claim 1, wherein the shear force is caused by movement of the magnetic material.

15. The dispersing method of the carbon nanotube in claim 1, wherein the carbon nanotube aggregate is not dispersed through an additional ball mill process, a chemical treatment, or a surface introduction of an additional function group.

16. The dispersing method of the carbon nanotube of claim 1, wherein in response to the dispersant being a water soluble polymer, adding a water or an alcohol, and in response to the dispersant being a common polymer, adding an aromatic hydrocarbon or a ketone.

17. The dispersing method of the carbon nanotube of claim 1, wherein the magnetic material is uniformly distributed throughout the carbon nanotube aggregate at a concentration of between 50 parts to 150 parts, for every 10 parts of the carbon nanotube aggregate, by weight.

18. The dispersing method of the carbon nanotube of claim 1, wherein a viscosity of the mixture is controlled depending on an intensity of the magnetic field.

* * * * *